United States Patent
Ye et al.

(10) Patent No.: US 11,423,473 B2
(45) Date of Patent: Aug. 23, 2022

(54) BLOCKCHAIN-BASED LEASING

(71) Applicant: Advanced New Technologies Co., Ltd., George Town (KY)

(72) Inventors: Xin Ye, Hangzhou (CN); Yanan Zhang, Hangzhou (CN); Zhonghao Lu, Hangzhou (CN); Hui Zhang, Hangzhou (CN); Wenjie Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 91 days.

(21) Appl. No.: 16/786,502

(22) Filed: Feb. 10, 2020

(65) Prior Publication Data

US 2020/0175583 A1 Jun. 4, 2020

Related U.S. Application Data

(63) Continuation of application No. PCT/CN2020/072119, filed on Jan. 15, 2020.

(30) Foreign Application Priority Data

Apr. 10, 2019 (CN) .......................... 201910284411.0

(51) Int. Cl.
*G06Q 30/06* (2012.01)
*G06Q 30/00* (2012.01)
*G06F 16/27* (2019.01)

(52) U.S. Cl.
CPC ......... *G06Q 30/0645* (2013.01); *G06F 16/27* (2019.01); *G06Q 30/018* (2013.01)

(58) Field of Classification Search
CPC ... G06Q 30/018; G06Q 30/0645; G06Q 16/27
(Continued)

(56) References Cited

U.S. PATENT DOCUMENTS

2003/0126047 A1* 7/2003 Hollar ............... G06Q 40/02
705/30
2018/0005143 A1* 1/2018 Camargo .......... G07C 9/00571
(Continued)

FOREIGN PATENT DOCUMENTS

CN 106886930 6/2017
CN 107194778 A * 9/2017 ............. G06Q 30/06
(Continued)

OTHER PUBLICATIONS

"Midasium: The Blockchain of Real Estate," [online], archived on Mar. 30, 2018. Available at: < https://web.archive.org/web/20180330054630/https://midasium.herokuapp.com/smart-tenancy > (Year: 2018).*

(Continued)

*Primary Examiner* — Richard W. Crandall
(74) *Attorney, Agent, or Firm* — Fish & Richardson P.C.

(57) ABSTRACT

This disclosure relates to blockchain-based leasing. In some aspects, a leasing party node device of a blockchain network comprising a plurality of connected blockchain nodes acquires leasable state data of a target lease object based on a unique identifier that uniquely identifies the target lease object. The leasable state data is stored in a distributed database on the blockchain network and the leasable state data specifies a leasable state of the target lease object. Lease information of the target lease object is generated in response to acquiring the leasable state data. A first update transaction is transmitted to the blockchain network to update the leasable state of the target lease object. The first update transaction includes at least a portion of the lease information.

16 Claims, 3 Drawing Sheets

(58) Field of Classification Search
USPC .......................................................... 705/307
See application file for complete search history.

(56) References Cited

U.S. PATENT DOCUMENTS

| | | | | |
|---|---|---|---|---|
| 2018/0322597 A1* | 11/2018 | Sher | ........................ | H04L 67/22 |
| 2019/0073701 A1* | 3/2019 | Sonnad | .................. | G06Q 20/02 |
| 2019/0073729 A1* | 3/2019 | Cheng-Shorland | .......................... G06Q 20/367 | |
| 2019/0173884 A1* | 6/2019 | Vincent | ................ | G06Q 20/065 |
| 2019/0303882 A1* | 10/2019 | Purushothaman | ... | G06Q 10/087 |
| 2019/0318433 A1* | 10/2019 | McGee | .................. | G06Q 50/16 |
| 2020/0005388 A1* | 1/2020 | Lim | ........................ | H04L 9/3247 |
| 2020/0175623 A1* | 6/2020 | Howie | .................. | G06Q 20/389 |
| 2020/0273094 A1* | 8/2020 | Lyubynskyy | ......... | H04L 9/3239 |

FOREIGN PATENT DOCUMENTS

| | | | | |
|---|---|---|---|---|
| CN | 107730751 | | 2/2018 | |
| CN | 107730751 A | * | 2/2018 | ......... G07F 17/0042 |
| CN | 108648056 | | 10/2018 | |
| CN | 108648056 A | * | 10/2018 | ......... G06Q 30/0645 |
| CN | 108717647 A | * | 10/2018 | ............. G06Q 30/02 |
| CN | 109064291 | | 12/2018 | |
| CN | 109064291 A | * | 12/2018 | ............. G06Q 30/06 |
| CN | 109409976 A | * | 3/2019 | ............. G06Q 30/06 |
| CN | 109544302 | | 3/2019 | |
| CN | 109544302 A | * | 3/2019 | ......... G06Q 30/0645 |
| CN | 109559205 | | 4/2019 | |
| CN | 109559205 A | * | 4/2019 | ......... G06Q 30/0645 |
| CN | 110175208 | | 8/2019 | |
| TW | M567924 | | 10/2018 | |

OTHER PUBLICATIONS

O'Brien, Bob, "Blockchain and Smart Contracts could Transform Property Transactions," WSJ Online, [online], published on Jan. 16, 2018, available at: < https://deloitte.wsj.com/articles/blockchain-and-smart-contracts-could-transform-property-transactions-1516078933 > (Year: 2018).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

International Search Report and Written Opinion in PCT Appln. No. PCT/CN2020/072119, dated Apr. 13, 2020 (full machine translation).

* cited by examiner

BLOCKCHAIN-BASED LEASING

CROSS-REFERENCE TO RELATED APPLICATIONS

This application is a continuation of PCT Application No. PCT/CN2020/072119, filed on Jan. 15, 2020, which claims priority from Chinese Patent Application No. 201910284411.0, filed on Apr. 10, 2019, and each application is hereby incorporated by reference in its entirety.

TECHNICAL FIELD

This disclosure relates to the field of data processing technology, and in particular, to blockchain-based leasing.

BACKGROUND

Blockchain technology, also known as distributed ledger technology, is an emerging technology in which several computing devices participate in "accounting" and jointly maintain a complete distributed database. Since blockchain technology has the characteristics of decentralization, openness and transparency, each computing device can participate in database records, and data can be quickly synchronized between computing devices, blockchain technology has been widely used in many fields.

SUMMARY

In view of this, one or more embodiments of the present disclosure provide a blockchain-based leasing method and apparatus, a computer equipment, and a computer readable storage medium.

In order to achieve the above objective, one or more embodiments of the present disclosure provide a blockchain-based leasing method that can be applied to a blockchain network that includes a leasing party node device. Leasable state data of a target lease object is stored in a distributed database on a blockchain. One example of the method includes: acquiring, by the leasing party node device, the leasable state data of the target lease object based on a unique identifier of the target lease object; generating lease information of the target lease object based on the leasable state data; and transmitting a first update transaction to the blockchain to update a leasable state of the target lease object, wherein the first update transaction includes at least part of the lease information.

In some embodiments, the lease information of the target lease object is lease contract information based on the target lease object. The leasable state data of the target lease object includes a current lease state of the target object, or a time limit of a leasing agreement, or a validity period of a lease contract.

In some embodiments, the leasable state data of the target lease object is stored in state data corresponding to a first smart contract. The method further includes: invoking the first smart contract, executing an update logic with respect to the leasable state of the target lease object declared by the first smart contract, and updating the leasable state data of the target lease object based on the at least part of the lease information.

In some embodiments, acquiring the leasable state data of the target lease object based on the unique identifier of the target lease object includes: transmitting, to the blockchain, a target search transaction, which includes the unique identifier of the target lease object; and invoking the first smart contract to execute a search logic with respect to the leasable state of the target lease object declared by the first smart contract, and acquiring the leasable state data of the target lease object based on the unique identifier of the target lease object.

In some embodiments, the blockchain is further deployed with a second smart contract for storing lease contract state data of the target lease object, and the method further includes: transmitting, to the blockchain, a second update transaction, which includes at least part of the lease contract information; and invoking the second smart contract to execute an update logic with respect to a lease contract state of the target lease object declared by the second smart contract, and updating the lease contract state data of the target lease object based on the at least part of the lease contract information.

In some embodiments, the method further includes: transmitting, to the blockchain, a target evidence storage transaction, which includes the lease contract of the target lease object.

In some embodiments, the blockchain is a consortium blockchain, and the blockchain further includes a regulatory party node device with respect to the target lease object. The leasing party node device and the regulatory party node device are consortium member node devices. The lease contract is encrypted by a service key of the leasing party node device. The regulatory party node device has a root key based on the service key. The method further includes: in response to a monitored event of updating the lease contract state data of the target lease object performed by the second smart contract, decrypting, by the regulatory party node device, the lease contract encrypted by the service key based on the root key.

Correspondingly, one or more embodiments of the present disclosure further provide a blockchain-based leasing apparatus that can be applied to a blockchain network that includes a leasing party node device. Leasable state data of a target lease object is stored in a distributed database on a blockchain. The apparatus can be used for the leasing party node device, and includes: an acquisition unit configured to acquire the leasable state data of the target lease object based on a unique identifier of the target lease object; a generation unit configured to generate lease information of the target lease object based on the leasable state data; and a transmission unit configured to transmit a first update transaction to the blockchain to update a leasable state of the target lease object, wherein the first update transaction includes at least part of the lease information.

In some embodiments, the lease information of the target lease object is lease contract information based on the target lease object; the leasable state data of the target lease object includes a current lease state of the target object, or a time limit of a leasing agreement, or a validity period of a lease contract.

In some embodiments, the leasable state data of the target lease object is stored in state data corresponding to a first smart contract, the apparatus further includes: an execution unit configured to invoke the first smart contract, execute an update logic with respect to the leasable state of the target lease object declared by the first smart contract, and update the leasable state data of the target lease object based on the at least part of the lease information.

In some embodiments, the acquisition unit is further configured to: transmit, to the blockchain, a target search transaction, which includes the unique identifier of the target lease object; and invoke the first smart contract to execute a search logic with respect to the leasable state of the target lease object declared by the first smart contract, and acquire the leasable state data of the target lease object based on the unique identifier of the target lease object.

In some embodiments, the blockchain is further deployed with a second smart contract for storing lease contract state data of the target lease object, and the transmission unit is further configured to: transmit, to the blockchain, a second update transaction, which includes at least part of the lease contract information. The execution unit is further configured to invoke the second smart contract, execute an update logic with respect to a lease contract state of the target lease object declared by the second smart contract, and update the lease contract state data of the target lease object based on the at least part of the lease contract information.

In some embodiments, the transmission unit is further configured to: transmit, to the blockchain, a target evidence storage transaction, which includes the lease contract of the target lease object.

Correspondingly, one or more embodiments of the present disclosure further provide a computer equipment, including: a memory and a processor, wherein a computer program executable by the processor is stored on the memory, and the processor, when executing the computer program, implements the leasing method executed by the leasing party node device as described above.

Correspondingly, one or more embodiments of the present disclosure further provide a computer readable storage medium having a computer program stored thereon, wherein the computer program is executed by a processor to implement the leasing method executed by the leasing party node device as described above.

As can be known from the above technical solutions, the present disclosure provides the blockchain-based leasing method and apparatus, the computer equipment, and the computer readable storage medium. The leasable state data of the target lease object is stored in the distributed database on the blockchain. Based on the consensus mechanism and tamper-resistant mechanism of the blockchain, the leasable state of the target lease object can be effectively maintained. As such, each node on the blockchain may share and search for the leasable state of the object, and the occurrence of invalid or repeated leases may be effectively prevented. In addition, in the leasing method and apparatus, the computer equipment, and the computer readable storage medium provided in this disclosure, the leasable state data is updated with the lease information of a newly established target lease object, which can conveniently and quickly ensure that the leasable state is an updated state. Based on the consensus mechanism of the blockchain, the history of updating the leasable state of the target lease object can be stored in the "ledger" on the blockchain, which is convenient for any node to check the update history.

DETAILED DESCRIPTION OF THE EMBODIMENTS

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with one or more examples of the present disclosure. Rather, they are merely examples of apparatuses and methods consistent with some aspects of one or more examples of the present disclosure as detailed in the appended claims.

It should be noted that, in other examples, the steps of the corresponding method may be not necessarily performed in the order shown and described in this disclosure. In some other examples, the method may include more or fewer steps than that described in this disclosure. In addition, a single step described in this disclosure may be divided into multiple steps for description in other examples, and multiple steps described in this disclosure may be combined into a single step for description in other examples.

The traditional solution of searching for a leasable state of a lease object executed by a centralized platform records a leasable state recording data of the lease object through the centralized platform, and completes the searching, updating and other maintenance operations of state data. Because the modification and missing of data by the centralized platform may cause information to be untrue or incomplete, it can be difficult for different centralized platforms to form mutual data trust and communication, thereby increasing the cost for maintaining the leasable state of the lease object.

In order to solve the above-mentioned problems, one or more embodiments of the present disclosure provide a blockchain-based leasing method, applied to a blockchain network that includes a leasing party node device. Leasable state data of a target lease object is stored in a distributed database on a blockchain.

The blockchain network described in one or more embodiments of the present disclosure can refer to a P2P network system with a distributed data storage structure reached by each node through a consensus mechanism. The data in the blockchain is distributed over "blocks" successively in terms of time, the latter block contains data summary of the previous block, and according to the consensus mechanism (such as POW, POS, DPOS, or PBFT, etc.), full data backup is achieved on all or some of the nodes. Those skilled in the art are familiar with the fact that since the blockchain network system operates under the corresponding consensus mechanism, it can be difficult to tamper the data that has been included in the blockchain database by any node. For example, a blockchain applying POW consensus can have existing data be tampered under at least an attack with 51% computing power of the whole network. Therefore, the blockchain system has the characteristics of ensuring data security and anti-tampering, which cannot be matched by other centralized database systems. It can be known that the data collected in the distributed database of the blockchain will not be attacked or tampered with, thereby ensuring the authenticity and reliability of the data information stored in the distributed database of the blockchain.

Example types of blockchain networks may include a public blockchain network, a private blockchain network, and a consortium blockchain network. The public blockchain network is open to all entities using a P2P network and participating in a consensus process. The private blockchain network is provided to an entity that centrally controls read and write permissions. The consortium blockchain network is provided to a selected entity group that controls the consensus process and includes an access control layer. The embodiments of this disclosure may be implemented in any suitable type of blockchain network.

A node or a node device described in one or more embodiments of this disclosure refers to that can join a blockchain by following corresponding node protocol and running the installation of a node protocol program as a node of the blockchain. Those skilled in the art may call a node device that has all data backup of the blockchain distributed database as a full node, and call a node device that has partial data backup of the blockchain distributed database, for example, data with only a block head, as a light node. In one or more embodiments of the present disclosure, the node type of the leasing party node device is not limited.

The leasing party described in one or more embodiments of this disclosure may include any party involved in leasing behaviors, for example, an entity such as a lessor, or a lessee, or a leasing intermediary, or a leasing behavior regulatory agency. When the leasing solution provided by one or more examples is implemented, different permissions may be configured for each party involved in the leasing behaviors. An entity such as the leasing intermediary having the permission to search for and update the leasable state data of a target lease object is used as the leasing party described in the examples to implement the technical solutions according to the examples.

The lease object includes any physical or virtual objects that can be used for leasing, such as real estates, cars and virtual goods, and is not limited in this disclosure. The leasable state data of the target lease object may include a unique identifier for identifying the target lease object, and state data for identifying whether the target lease object is available for rent. For example, the identifier "1" indicates that the target lease object is not in a leasable state, and the identifier "0" indicates that the target lease object is in a leasable state. In some embodiments, the leasable state data of the target lease object may also include other attribute data related to the lease state of the target object, for example, data such as a starting time limit for indicating the leasable/not leasable state, and a time duration of the leasable/not leasable state.

The leasable state data of the target lease object that is stored in the distributed database on the blockchain as described in the present disclosure may have various embodiments. For example, the leasable state data of the target lease object may be stored in a transaction record of a block (or called "ledger") on the blockchain in form of transaction contents, and the leasable state of the target lease object is recorded or updated in form of transaction.

A transaction described in one or more embodiments in this disclosure refers to a piece of data created by a node device of a blockchain and needs to be finally released to a block of the blockchain. The transactions in the blockchain are classified into transactions in a narrow sense and transactions in a broad sense. A transaction in a narrow sense refers to a value transfer released by a user to the blockchain. For example, in a traditional Bitcoin blockchain network, a transaction can be a transfer initiated by a user in the blockchain. A transaction in a broad sense refers to service data with a business intention published by a user entity to the blockchain through a node, such as the transaction for storing the leasable state data of the target lease object as described herein, the leasable state of the target lease object, or a change in an evidence storage of the state.

To further provide a background to the embodiments of this disclosure, in a blockchain network, applications can be developed, tested, and deployed for execution within the blockchain network. Example applications can include, but are not limited to, smart contracts. A smart contract can be described as a digital representation of a real-world legal contract that has contract terms that affect the parties. The smart contract is implemented, stored, updated (as needed), and executed within the blockchain network. Contract parties (for example, buyers and sellers) associated with a smart contract are represented as nodes in the blockchain network.

In some embodiments, the smart contract can store data that can be used to record information, facts, associations, balances, and any other information needed to implement contract execution logic. A smart contract can be described as a computer-executable program consisting of functions, in which an instance of the smart contract can be created and a function can be invoked to execute the logic of the smart contract.

In terms of technology, smart contracts can be implemented based on objects and object-oriented classes. For example, the terms and components of a smart contract can be represented as object handled by an application that implements the smart contract. A smart contract (or an object in a smart contract) can invoke another smart contract (or an object in the same smart contract) like other object-oriented objects. For example, an invoking made by an object can be invoking creating, updating, deleting, propagating, or communicating with an object of another class. Invoking between objects can be implemented by functions, methods, application programming interfaces (APIs), or other invoking mechanisms. For example, a first object can invoke a function to create a second object.

Therefore, based on the above description of smart contracts, the leasable state data of the target lease object described in one or more embodiments of the present disclosure may also be stored in the "state database" on the blockchain, for example, in a "storage" content of a smart contract account, or in a "receipts" tree corresponding to the execution of a smart contract. The leasable state of the target lease object is managed and maintained by the smart contract to execute the addition, deletion, review, and modification of the leasable state data of the target lease object. Those skilled in the art may know that the "storage" content of a smart contract account may be stored in a "state tree" of the contract account in form of an MPT tree. The "state tree" or "receipts tree" is stored in a local database of each node device on the blockchain as the content of a "state database" in the distributed database on the blockchain. Examples of using the smart contract for managing and maintaining the leasable state of the target lease object will be described in detail below.

Figure 1:
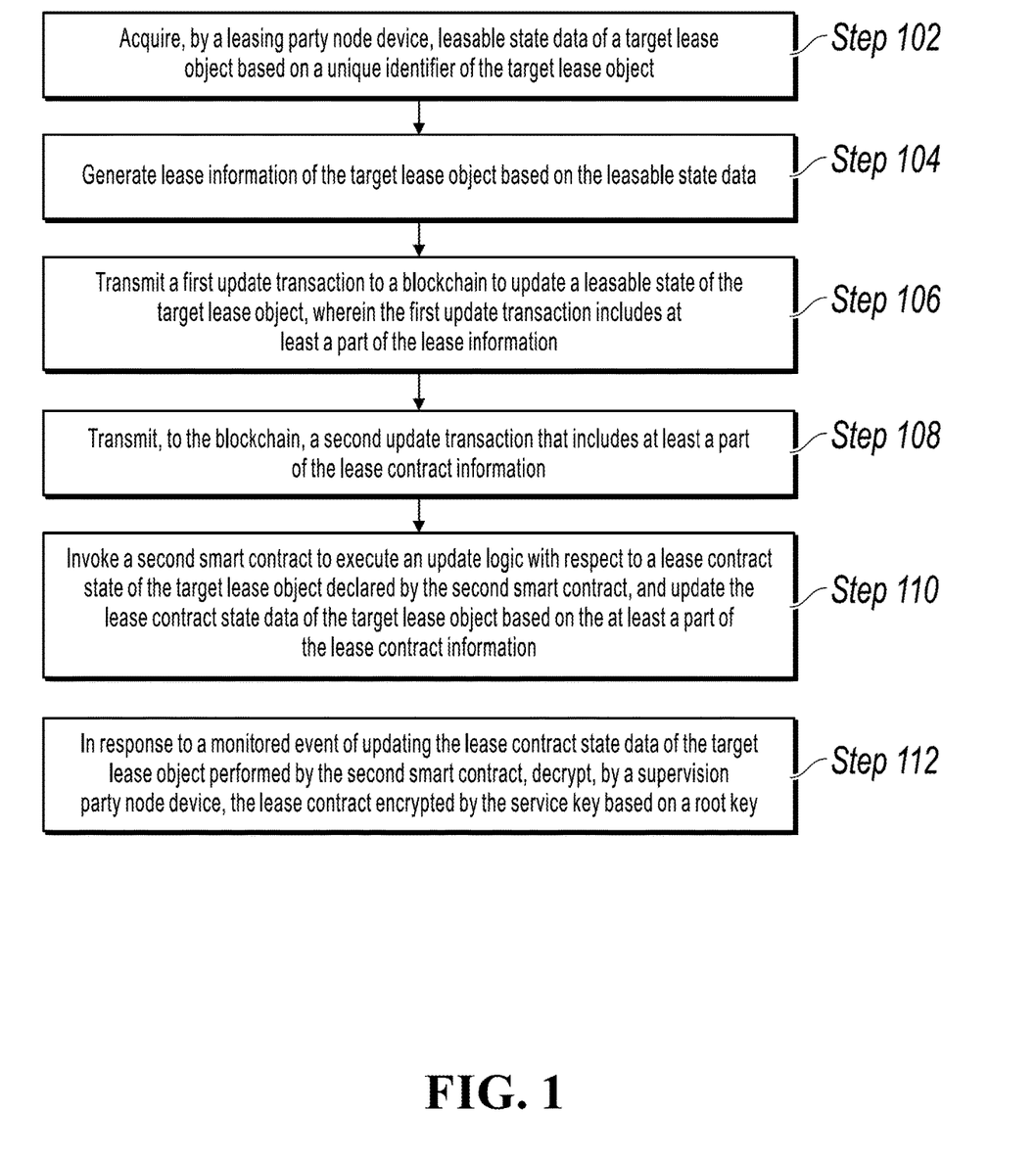
FIG. 1 is a schematic flowchart illustrating a blockchain-based leasing method according to an embodiment of the present disclosure.

As shown in FIG. 1, a blockchain-based leasing method according to an embodiment includes the following steps.

At step 102, the leasing party node device acquires the leasable state data of the target lease object based on a unique identifier of the target lease object.

Based on different manners in which the leasable state data of the target lease object is stored, manners in which the leasing party node device acquires the leasable state data of the target lease object are different.

When the leasable state data of the target lease object is stored in a block on the blockchain in form of transaction, the leasing party node device may acquire the leasable state data of the target lease object from the block on the blockchain based on the unique identifier of the target lease object.

When the leasable state data of the target lease object is stored in "state data" corresponding to a smart contract and stored locally in a blockchain network node device, it is possible to implement the acquisition of the leasable state data of the target lease object by invoking the smart contract. In another example, the blockchain is deployed with a first smart contract for managing and maintaining the leasable state data of the target lease object (or a plurality of lease objects including the target lease object). In this example, the first smart contract declares a search logic (function) with respect to the leasable state data. Acquiring the leasable state data of the target lease object based on the unique identifier of the target lease object includes: transmitting, to the blockchain, a target search transaction, which includes the unique identifier of the target lease object; and invoking the first smart contract, executing a search logic with respect to the leasable state of the target lease object declared by the first smart contract, and acquiring the leasable state data of the target lease object based on the unique identifier of the target lease object.

At step 104, lease information of the target lease object is generated based on the leasable state data.

Based on the existing leasable state data of the target lease object, for example, data indicating that it is currently in a leasable state, or data indicating that it may be in a leasable state after a certain period of time, etc., the lease information of the target lease object is generated. The lease information may include data information indicating a lease behavior of using the target lease object in a new phase, or a lease continuing behavior, or a behavior of interrupting the lease being conducted in the last phase. In order to prove the validity of the lease information, the lease information may be lease contract information of the lease behavior of using the target lease object in the new phase, or the lease continuing behavior, or the behavior of interrupting the lease being conducted in the last phase. The lease contract information can include the identity or signature information of a lessor, a lessee, or an intermediary agency, and further includes the time limit agreement on the lease, renewal or termination behavior of the target lease object, and so on.

At step 106, a first update transaction is transmitted to the blockchain to update a leasable state of the target lease object, wherein the first update transaction includes at least part of the lease information.

The first update transaction is configured to update the leasable state of the target lease object based on the lease information, for example, based on the contents of the lease information, to change the state of whether the target lease object can be used for lease, and update the time limit of the target lease object being in a leasing state.

When the leasable state information of the target lease object is stored in a block on the blockchain, the first update transaction is a new transaction added to the block on the blockchain in form of transaction. The first update transaction may include the unique identifier of the target lease object and a result of updating the leasable state of the target lease object.

The leasable state data of the target lease object is stored in state data corresponding to a first smart contract. The first update transaction may be an invoking transaction of the first smart contract configured to invoke the first smart contract, execute an update logic with respect to the leasable state of the target lease object declared by the first smart contract, and update the leasable state data of the target lease object based on the at least part of the lease information. Those skilled in the art may know that writing an execution result of the smart contract on the blockchain may include writing a transaction log and using the transaction log as a transaction receipt to insert it into a Receipts tree stored locally in the node device. In some scenarios, the execution result of the smart contract may also be written into a Storage tree of the smart contract. Thus, the leasable state of the target lease object is stored in the distributed database on the blockchain.

The maintenance and management of the leasable state data of the target lease object based on the first smart contract may more conveniently and quickly complete the addition, deletion, modification and review of the state data. Moreover, the deployment, execution process and result of the first smart contract are subject to the consensus and verification of each node device on the blockchain, which, compared to centralized platform typed data management, may more fairly maintain and manage the leasable state data and increase the credibility of the data.

According to the blockchain-based leasing method described in one or more examples, the leasable state data of the target lease object is stored in the distributed database on the blockchain, and based on the consensus mechanism and tamper-resistant mechanism of the blockchain, the leasable state data of the target lease object can be effectively maintained. As such, each node on the blockchain may share and search for the leasable state of the object, mutual data communication and trust are achieved, and the occurrence of invalid leases may be effectively prevented. In addition, in the leasing method provided in this disclosure, the leasable state data is updated with the lease information of a newly established target lease object, which may ensure that the leasable state is an updated state. Based on the consensus mechanism of the blockchain, the history of updating the leasable state of the target lease object can be stored in the "ledger" on the blockchain, which is convenient for any node to check the update history.

In some embodiments of the present disclosure, in order to provide actual evidence or data support for the leasable state of the target lease object, the blockchain is also deployed with a second smart contract for storing lease contract state data of the target lease object. Because contracts can be legally bound and are expressions of true meaning from respective parties of the contracts, a lease contract based on the target lease object directly provides evidence or data support for the leasable state of the target lease object.

Correspondingly, the blockchain-based leasing method described in this example further includes the following steps.

At step 108, a second update transaction is transmitted to the blockchain, which includes at least part of the lease contract information. For example, the at least part of the lease contract information may include the unique identifier of the target lease object, a contract serial number (electronic contract number), a contract state identifier (0: to be signed, 1: signed, 2: cancelled), and may further include information such as the starting time and ending time of a contract's validity period, or the starting time of contract cancellation.

At step 110, the second smart contract is invoked. An update logic with respect to a lease contract state of the target lease object declared by the second smart contract is executed. The lease contract state data of the target lease object is updated based on the at least part of the lease contract information. Writing an execution result of the smart contract on the blockchain may include writing a transaction log and using the transaction log as a transaction receipt to insert it into a Receipts tree stored locally in the node device. In some scenarios, the execution result of the smart contract may also be written into a Storage tree of the smart contract. Thus, the lease contract state of the target lease object is stored in the distributed database on the blockchain.

As the contents of the original text of a lease contract may have a large data capacity, and the lease contract may involve private information such as the identities, addresses, rights and obligations of respective parties of the contract, the second smart contract configured to manage the state of the lease contract may be insufficient to maintain all information of the lease contract, especially a lease contract involving a plurality of target lease objects. In some embodiments of the present disclosure, the leasing party node device may further transmit a target evidence storage transaction to the blockchain, and the target evidence storage transaction includes the lease contract of the target lease object, and is configured to store as an evidence the lease contract of the target lease object on the blockchain.

The consortium blockchain network may be described to be lightly centralized or multicentric. Each node of the consortium blockchain network is operated by consortium member participants. That is, the participants join the blockchain network to form a consortium with the same service request, and each node maintains a blockchain operation. In the consortium blockchain network, the trust foundation of authorized consortium participants is established on the consortium blockchain. Unlike the public blockchain network in which all transaction information is stored on the public blockchain in clear text, data in the consortium blockchain network may be encrypted and stored on the consortium blockchain as ciphertext. Therefore, the consortium blockchain network may need a key management function to achieve privacy isolation and sharing in the consortium blockchain network.

When the blockchain-based leasing method described in this example is applied to the consortium blockchain, a regulatory party node device may be disposed on the consortium blockchain to supervise service data transmitted by node devices of other consortium member parties. Because the data transmitted by each consortium member node is usually encrypted, the regulatory party may be used as a key management party on the consortium blockchain, and be responsible for distributing service keys for other consortium members. The regulatory party has root keys of the service keys of other consortium members to decrypt data encrypted by any subkey (which is used as a service key) distributed according to the root keys. This example does not limit the specific manner of distributing subkeys according to root keys. For example, the manner of a KDF key tree may be used by the regulatory party to distribute subkeys to other consortium members, for example, the leasing party, as service keys.

Those skilled in the art may know that during the execution of a contract code in a smart contract, a series of events may be generated. The contents of these events depend on an execution logic involved in the contract code in the smart contract. These events basically cover all intermediate processes corresponding to the execution logic included in the smart contract, as well as final results. After any node device executes the corresponding code of the smart contract in a local EVM, these events may be written in a transaction log. The transaction log is eventually stored as a part of a transaction receipt in the Receipts tree as described above.

Therefore, the leasing method described in this disclosure may further include the following step 112: in response to a monitored event of updating the lease contract state data of the target lease object performed by the second smart contract, the regulatory party node device decrypts the lease contract encrypted by the service key based on the root key. This facilitates the management of the lease contract by the regulatory party, such as the management and review of detailed contract contents conducted by a government agency to a housing lease or a public rental housing lease within its jurisdiction district.

Corresponding to the embodiment of the above process, some embodiments of the present disclosure also provides a blockchain-based leasing apparatus 20. The apparatus 20 may be implemented by software or by hardware or by a combination of software and hardware. Taking software embodiment as an example, as a logical apparatus, it is formed by a CPU (Central Process Unit) of a device, where it is located, reading corresponding computer program instructions into a memory for execution. In terms of hardware, in addition to a CPU, an internal storage, and a memory shown in FIG. 3, the device where the leasing apparatus is located usually further includes other hardware such as chips for transmitting and receiving radio signals, and/or board cards for realizing network communication functions.

Figure 2:
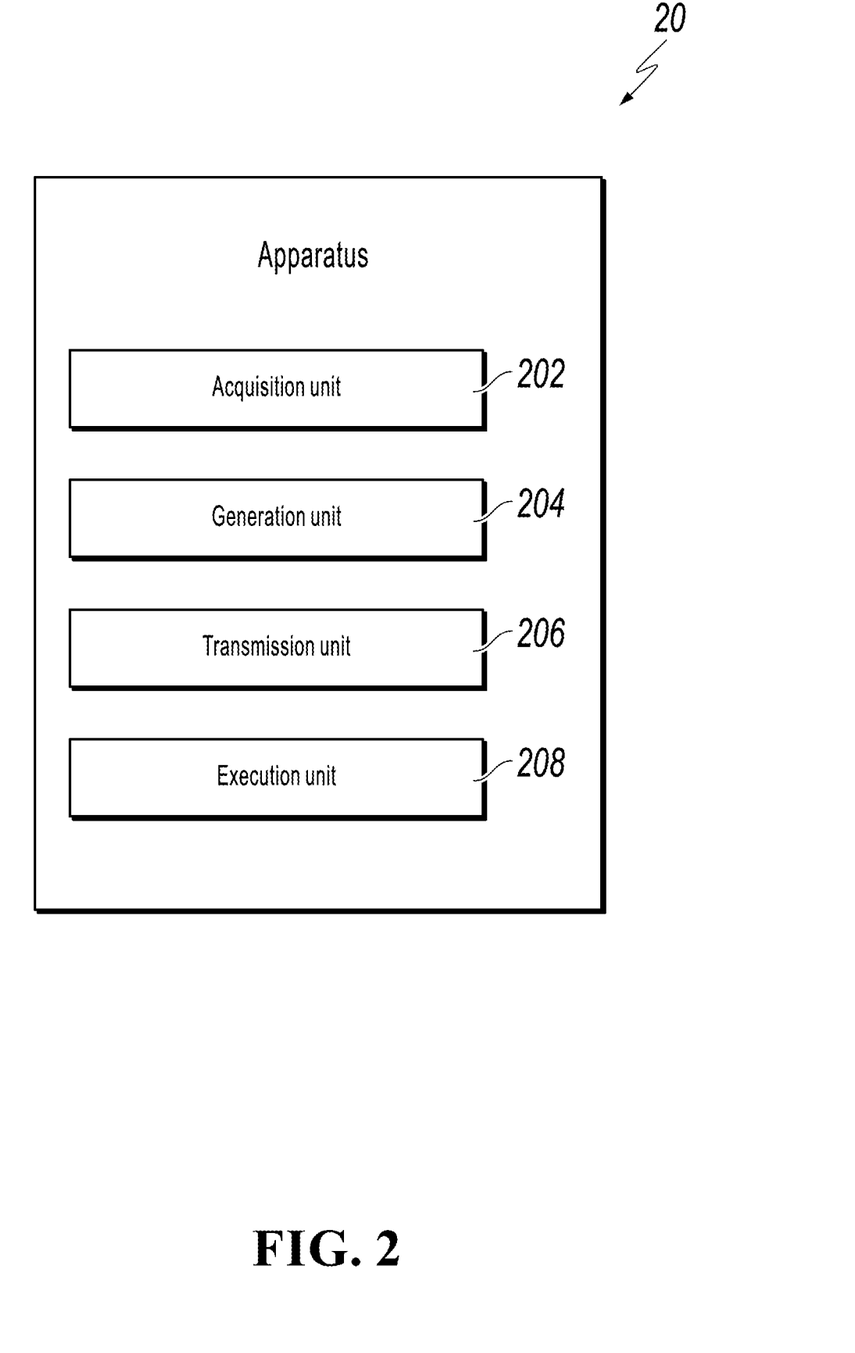
FIG. 2 is a schematic diagram illustrating a blockchain-based leasing apparatus applied to a leasing party node device terminal according to an embodiment of the present disclosure.

As shown in FIG. 2, the present disclosure also provides a blockchain-based leasing apparatus 20 that can be applied to a blockchain network that includes a leasing party node device. Leasable state data of a target lease object is stored in a distributed database on a blockchain. The apparatus 20 can be used for the leasing party node device, and includes: an acquisition unit 202 configured to acquire the leasable state data of the target lease object based on a unique identifier of the target lease object; a generation unit 204 configured to generate lease information of the target lease object based on the leasable state data; and a transmission unit 206 configured to transmit a first update transaction to the blockchain to update a leasable state of the target lease object, wherein the first update transaction includes at least part of the lease information.

In some embodiments, the lease information of the target lease object is lease contract information based on the target lease object. The leasable state data of the target lease object includes a current lease state of the target object, or a time limit of a leasing agreement, or a validity period of a lease contract.

In some embodiments, the leasable state data of the target lease object is stored in state data corresponding to a first smart contract. The apparatus further includes: an execution unit 208 configured to invoke the first smart contract, execute an update logic with respect to the leasable state of the target lease object declared by the first smart contract, and update the leasable state data of the target lease object based on the at least part of the lease information.

In some embodiments, the acquisition unit 202 is further configured to: invoke the first smart contract, execute a search logic with respect to the leasable state of the target lease object declared by the first smart contract, and acquire the leasable state data of the target lease object based on the unique identifier of the target lease object.

In some embodiments, the blockchain is further deployed with a second smart contract for storing lease contract state data of the target lease object, and the transmission unit 206 is further configured to: transmit, to the blockchain, a second update transaction, which includes at least part of the lease contract information. The execution unit 208 is further configured to invoke the second smart contract, execute an update logic with respect to a lease contract state of the target lease object declared by the second smart contract, and update the lease contract state data of the target lease object based on the at least part of the lease contract information.

In some embodiments, the transmission unit 206 is further configured to: transmit, to the blockchain, a target evidence storage transaction, which includes the lease contract of the target lease object.

For details about the implementation process of functions and roles of units in the apparatus 20, reference may be made to the implementation process of corresponding steps in the leasing method executed by the leasing party node device. For the related parts, reference may be made to the description of the method examples, which will not be described herein again.

The apparatus examples described above are merely illustrative, wherein the units described as separate components may or may not be physically separated, and the components displayed as units may or may not be physical units, i.e., may be located in one place or may be distributed to multiple network modules. Some or all of the units or modules may be selected according to actual needs to achieve the objectives of solutions in the present disclosure. Those of ordinary skill in the art can understand and implement the present disclosure without any creative effort.

The apparatus, unit, or module illustrated in the above examples may be implemented specifically by using a computer chip or an entity, or by using a product having a certain function. An implementation device can be a computer, and the form of the computer may be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Figure 3:
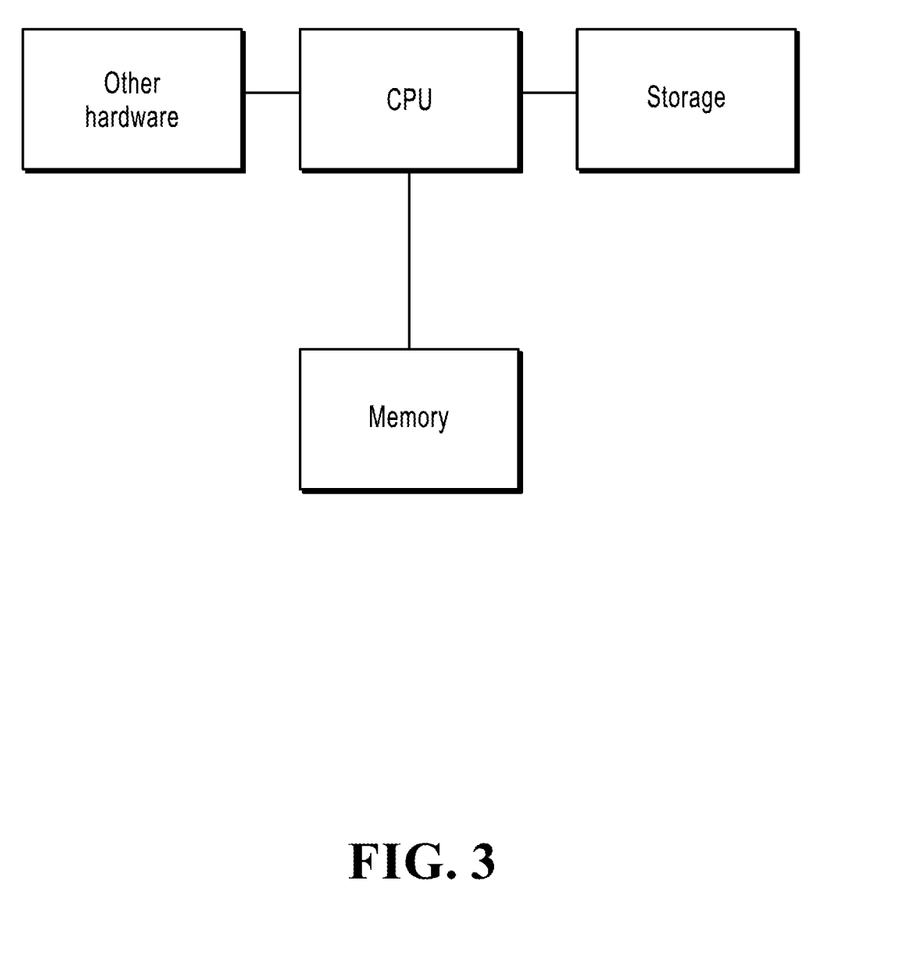
FIG. 3 is a hardware structural diagram illustrating a blockchain-based leasing apparatus according to an embodiment of the present disclosure.

Corresponding to the method examples, some embodiments of the present disclosure also provides a computer equipment. As shown in FIG. 3, the computer equipment includes a memory and a processor. A computer program executable by the processor is stored on the memory, and the processor, when executing the stored computer program, implements the steps of the leasing method performed by the leasing party node device in some embodiments of the present disclosure. For detailed description about each step of the leasing method performed by the leasing party node device, reference may be made to the previous contents, which will not be repeated.

Corresponding to the method examples, some embodiments of the present disclosure also provides a computer readable storage medium having a computer program stored thereon. The computer program is executed by a processor to implement the steps of the leasing method performed by the leasing party node device in the examples of the present disclosure. For detailed description about each step of the leasing method performed by the leasing party node device, reference may be made to the previous contents, which will not be repeated.

The above are some embodiments of the present disclosure, which are not intended to limit the disclosure. Any modification, equivalent substitution, or improvement made within the spirit and principle of the present disclosure shall be included within the protection scope of the disclosure.

In a configuration, a computing device includes one or more processors (CPUs), input/output interfaces, network interfaces, and memories.

The memories may include a non-permanent memory in a computer readable medium, a random access memory (RAM), and/or a non-volatile memory, and memories in other forms such as a read only memory (ROM) or a flash memory (flash RAM). Memory is an example of the computer readable medium.

The computer readable medium includes permanent and non-persistent, removable and non-removable media that may accomplish information storage by any method or technology. Information may be computer readable instructions, data structures, modules of a program, or other data. Examples of the computer storage medium include, but are not limited to, a phase change memory (PRAM), a static random access memory (SRAM), a dynamic random access memory (DRAM), other types of random access memory (RAM), a read only memory (ROM), an electrically erasable programmable read only memory (EEPROM), a flash memory or other memory technologies, a compact disc read only memory (CD-ROM), a digital versatile disc (DVD) or other optical storage, a cartridge magnetic tape, a magnetic tape or disk storage or other magnetic storage devices or any other non-transmission media that may be used to store information accessible by a computing device. As defined herein, the computer readable medium does not include transitory computer readable media (transitory media) such as modulated data signals and carriers.

It should also be noted that the terms "including", "comprising" or any other variants thereof are intended to cover non-exclusive inclusion, so that a process, method, product, or device that includes a series of elements includes not only those elements, but also other elements not explicitly listed, or those that are inherent to such process, method, product, or device. Without more restrictions, elements defined by the sentence "including a . . . " do not exclude the existence of other identical elements in the process, method, product or device including the elements.

Those skilled in the art should understand that the examples of the present disclosure can be implemented as a method, a system, or a computer program product. Therefore, the examples of the present disclosure may take the form of an entirely hardware example, an entirely software example, or a software and hardware combined example. Moreover, the examples of the present disclosure may take the form of a computer program product implemented on one or more computer usable storage media (including but not limited to a magnetic disk storage, a CD-ROM, an optical storage, etc.) including computer usable program codes.

The invention claimed is:

1. A computer-implemented method, comprising:
acquiring, by a leasing party node device of a blockchain network comprising a blockchain and a plurality of connected blockchain nodes, first leasable state data of a target lease object based on a unique identifier that uniquely identifies the target lease object, wherein:
the first leasable state data is stored in a distributed database on the blockchain network and the first leasable state data specifies a current leasable state for a current lease of the target lease object that represents whether the target lease object is currently available for lease and a validity time period for which the current leasable state is valid;
the distributed database comprises:
a first smart contract for managing and updating leasable state data for a plurality of lease objects including the target lease object, the first smart contract comprising:
search logic that, when executed for any first lease object of the plurality of lease objects, obtains the leasable state data of the first lease object from the distributed database using a first identifier for the first lease object; and update logic that, when executed for any second leasable object of the plurality of lease objects, updates the leasable state data of the second lease object in the distributed database using a second identifier for the second lease object, wherein acquiring the first leasable state data for the target lease object, comprises;

transmitting, to the blockchain network, a target search transaction comprising the unique identifier for the target lease object and invoking, in response to the target search transaction, the first smart contract using the unique identifier for the target lease object to execute the search logic, wherein executing the search logic comprises obtaining the first leasable state data from state data corresponding to the first smart contract;

generating lease information of the target lease object in response to acquiring the first leasable state data, wherein the lease information comprises the validity time period for the current lease of the target lease object; and transmitting a first update transaction to the blockchain network to update the first leasable state data, wherein the first update transaction comprises (i) at least a portion of the lease information comprising the unique identifier for the target lease object and the validity time period for the current lease of the target lease object and (ii) and an updated validity time period for the current lease of the target lease object, and wherein the first update transaction invokes (i) the first smart contract to update the first leasable state data using the unique identifier for the target lease object and the updated validity time period and (ii) a second smart contract to update lease contract state data for the target lease object, wherein the lease contract state data includes details of a lease contract for the current lease of the target lease object.

2. The computer-implemented method of claim 1, wherein:

the lease information of the target lease object comprises lease contract information for the lease contract for the current lease of the target lease object; and the first leasable state data of the target lease object comprises a time limit of a leasing agreement for the target lease object.

3. The computer-implemented method of claim 2, wherein the second smart contract stores the lease contract state data for the target lease object, the method further comprising:

transmitting, to the blockchain, a second update transaction, wherein the second update transaction comprises at least a portion of the lease contract information;

invoking the second smart contract to execute additional update logic with respect to a lease contract state of the target lease object, wherein the additional update logic is declared by the second smart contract; and updating, based on execution of the additional update logic, the lease contract state data of the target lease object based on the at least a portion of the lease contract information.

4. The computer-implemented method of claim 3, further comprising:

transmitting, to the blockchain network, a target evidence storage transaction, wherein the target evidence storage transaction (i) comprises the lease contract for the current lease of the target lease object and (ii) stores all information of the lease contract for the current lease of the target lease object on the blockchain separate from the second smart contract.

5. The computer-implemented method of claim 4, wherein the blockchain network is a consortium blockchain network, and the blockchain network further comprises a regulatory party node device with respect to the target lease object, wherein the leasing party node device and the regulatory party node device are consortium member node devices, wherein the lease contract is encrypted by a service key of the leasing party node device, wherein the regulatory party node device has a root key based on the service key; and wherein the method further comprises:

in response to a monitored event of updating the lease contract state data for the target lease object performed by the second smart contract, decrypting, by the regulatory party node device, the lease contract encrypted by the service key using the root key.

6. The computer-implemented method of claim 1, wherein lease contract state data for the target lease object comprises the unique identifier of the target lease object, a contract serial number, and a contract state identifier that indicates whether the lease contract for the current lease of the target lease object is (i) to be signed, (ii) signed, or (iii) canceled).

7. A computer-implemented system, comprising:

one or more computers; and one or more computer memory devices interoperably coupled with the one or more computers and having tangible, non-transitory, machine-readable media storing one or more instructions that, when executed by the one or more computers, perform operations comprising:

acquiring, by a leasing party node device of a blockchain network comprising a blockchain and a plurality of connected blockchain nodes, first leasable state data of a target lease object based on a unique identifier that uniquely identifies the target lease object, wherein:

the first leasable state data is stored in a distributed database on the blockchain network and the first leasable state data specifies a current leasable state for a current lease of the target lease object that represents whether the target lease object is currently available for lease and a validity time period for which the current leasable state is valid;

the distributed database comprises:

a first smart contract for managing and updating leasable state data for a plurality of lease objects including the target lease object, the first smart contract comprising; search logic that, when executed for any first lease object of the plurality of lease objects, obtains the leasable state data of the first lease object from the distributed database using a first identifier for the first lease object; and update logic that, when executed for any second leasable object of the plurality of lease objects, updates the leasable state data of the second lease object in the distributed database using a second identifier for the second lease object, wherein acquiring the first leasable state data for the target lease object, comprises:

transmitting, to the blockchain network, a target search transaction comprising the unique identifier for the target lease object and invoking, in response to the target search transaction, the first smart contract using the unique identifier for the target lease object to execute the search logic, wherein executing the search logic comprises obtaining the first leasable state data from state data corresponding to the first smart contract;

generating lease information of the target lease object in response to acquiring the first leasable state data, wherein the lease information comprises the validity time period for the current lease of the target lease object; and transmitting a first update transaction to the blockchain network to update the first leasable state data, wherein the first update transaction comprises (i) at least a portion of the lease information comprising the unique identifier for the target lease object and the validity time period for the current lease of the target lease object and (ii) and an updated validity time period for the current lease of the target lease object, and wherein the first update transaction invokes (i) the first smart contract to update the first leasable state data using the unique identifier for the target lease object and the updated validity time period and (ii) a second smart contract to update lease contract state data for the target lease object, wherein the lease contract state data includes details of a lease contract for the current lease of the target lease object.

8. The computer-implemented system of claim 7, wherein:

the lease information of the target lease object comprises lease contract information for the lease contract for the current lease of the target lease object; and the first leasable state data of the target lease object comprises a time limit of a leasing agreement for the target lease object.

9. The computer-implemented system of claim 8, wherein:

the second smart contract stores the lease contract state data for the target lease object; and the operations further comprise:

transmitting, to the blockchain, a second update transaction, wherein the second update transaction comprises at least a portion of the lease contract information;

invoking the second smart contract to execute additional update logic with respect to a lease contract state of the target lease object, wherein the additional update logic is declared by the second smart contract; and updating, based on execution of the additional update logic, the lease contract state data of the target lease object based on the at least a portion of the lease contract information.

10. The computer-implemented system of claim 9, wherein the operations comprise:

transmitting, to the blockchain network, a target evidence storage transaction, wherein the target evidence storage transaction (i) comprises the lease contract for the current lease of the target lease object and (ii) stores all information of the lease contract for the current lease of the target lease object on the blockchain separate from the second smart contract.

11. The computer-implemented system of claim 10, wherein the blockchain network is a consortium blockchain network, and the blockchain network further comprises a regulatory party node device with respect to the target lease object, wherein the leasing party node device and the regulatory party node device are consortium member node devices, wherein the lease contract is encrypted by a service key of the leasing party node device, wherein the regulatory party node device has a root key based on the service key; and wherein the operations further comprise:

in response to a monitored event of updating the lease contract state data for the target lease object performed by the second smart contract, decrypting, by the regulatory party node device, the lease contract encrypted by the service key using the root key.

12. A non-transitory, computer-readable medium storing one or more instructions executable by a computer system to perform operations comprising:

acquiring, by a leasing party node device of a blockchain network comprising a blockchain and a plurality of connected blockchain nodes, first leasable state data of a target lease object based on a unique identifier that uniquely identifies the target lease object, wherein:

the first leasable state data is stored in a distributed database on the blockchain network and the first leasable state data specifies a current leasable state for a current lease of the target lease object that represents whether the target lease object is currently available for lease and a validity time period for which the current leasable state is valid;

the distributed database comprises:

a first smart contract for managing and updating leasable state data for a plurality of lease objects including the target lease object, the first smart contract comprising:

search logic that, when executed for any first lease object of the plurality of lease objects, obtains the leasable state data of the first lease object from the distributed database using a first identifier for the first lease object; and update logic that, when executed for any second leasable object of the plurality of lease objects, updates the leasable state data of the second lease object in the distributed database using a second identifier for the second lease object, wherein acquiring the first leasable state data for the target lease object, comprises:

transmitting, to the blockchain network, a target search transaction comprising the unique identifier for the target lease object; and invoking, in response to the target search transaction, the first smart contract using the unique identifier for the target lease object to execute the search logic, wherein executing the search logic comprises obtaining the first leasable state data from state data corresponding to the first smart contract;

generating lease information of the target lease object in response to acquiring the first leasable state data, wherein the lease information comprises the validity time period for the current lease of the target lease object; and transmitting a first update transaction to the blockchain network to update the first leasable state data, wherein the first update transaction comprises (i) at least a portion of the lease information comprising the unique identifier for the target lease object and the validity time period for the current lease of the target lease object and (ii) and an updated validity time period for the current lease of the target lease object, and wherein the first update transaction invokes (i) the first smart contract to update the first leasable state data using the unique identifier for the target lease object and the updated validity time period and (ii) a second smart contract to update lease contract state data for the target lease object, wherein the lease contract state data includes details of a lease contract for the current lease of the target lease object.

13. The non-transitory, computer-readable medium of claim 12, wherein:
the lease information of the target lease object comprises lease contract information for the lease contract for the current lease of the target lease object; and
the first leasable state data of the target lease object comprises a time limit of a leasing agreement for the target lease object.

14. The non-transitory, computer-readable medium of claim 13, wherein:
the second smart contract stores the lease contract state data for the target lease object; and
the operations further comprise:
transmitting, to the blockchain, a second update transaction, wherein the second update transaction comprises at least a portion of the lease contract information;
invoking the second smart contract to execute additional update logic with respect to a lease contract state of the target lease object, wherein the additional update logic is declared by the second smart contract; and
updating, based on execution of the additional update logic, the lease contract state data of the target lease object based on the at least a portion of the lease contract information.

15. The non-transitory, computer-readable medium of claim 14, wherein the operations comprise:
transmitting, to the blockchain network, a target evidence storage transaction, wherein the target evidence storage transaction (i) comprises the lease contract for the current lease of the target lease object and (ii) stores all information of the lease contract for the current lease of the target lease object on the blockchain separate from the second smart contract.

16. The non-transitory, computer-readable medium of claim 15, wherein the blockchain network is a consortium blockchain network, and the blockchain network further comprises a regulatory party node device with respect to the target lease object, wherein the leasing party node device and the regulatory party node device are consortium member node devices, wherein the lease contract is encrypted by a service key of the leasing party node device, wherein the regulatory party node device has a root key based on the service key; and
wherein the operations further comprise:
in response to a monitored event of updating the lease contract state data for the target lease object performed by the second smart contract, decrypting, by the regulatory party node device, the lease contract encrypted by the service key using the root key.

* * * * *

UNITED STATES PATENT AND TRADEMARK OFFICE
CERTIFICATE OF CORRECTION

PATENT NO. : 11,423,473 B2
APPLICATION NO. : 16/786502
DATED : August 23, 2022
INVENTOR(S) : Xin Ye et al.

It is certified that error appears in the above-identified patent and that said Letters Patent is hereby corrected as shown below:

In the Claims

Column 13, Line 9, in Claim 1, delete "comprises;" and insert -- comprises: --.

Column 13, Line 12, in Claim 1, delete "object" and insert -- object; --.

Column 14, Line 29, in Claim 6, delete "canceled)." and insert -- canceled. --.

Column 14, Line 55, in Claim 7, delete "comprising;" and insert -- comprising: --.

Signed and Sealed this
Eleventh Day of October, 2022

Katherine Kelly Vidal
*Director of the United States Patent and Trademark Office*